United States Patent [19]
Tanaka

[11] Patent Number: 5,434,938
[45] Date of Patent: Jul. 18, 1995

[54] DIRECT DRIVE GUIDE UNIT
[75] Inventor: Kazuhiko Tanaka, Gifu, Japan
[73] Assignee: Nippon Thompson Co. Ltd., Tokyo, Japan
[21] Appl. No.: 56,744
[22] Filed: May 4, 1993
[30] Foreign Application Priority Data
  May 7, 1992 [JP] Japan .................. 4-141081
[51] Int. Cl.⁶ .................................. F16C 29/06
[52] U.S. Cl. ........................................ 385/44
[58] Field of Search ................. 384/44, 45, 43; 464/168

[56] References Cited
U.S. PATENT DOCUMENTS
5,161,896 11/1992 Höfling et al. ................ 384/44
5,161,897 11/1992 Ng et al. ....................... 384/44
5,248,202 9/1993 Kawasugi et al. ............. 384/45

Primary Examiner—Lenard A. Footland
Attorney, Agent, or Firm—Sughrue, Mion, Zinn, Macpeak & Seas; Richard C. Turner; John F. Rabena

[57] ABSTRACT

The present invention relates to a direct drive guide unit that, while being able to be manufactured easily as a result of having a small number of parts, achieves a low level of noise, does not require lubrication, is resistant to rust and chemicals, is not susceptible to magnetism, and demonstrates favorable response characteristics.

The above-mentioned effects are obtained by forming a slider by coupling divided pieces, for example, formed into two pieces, and making said slider from plastic.

8 Claims, 11 Drawing Sheets

DIRECT DRIVE GUIDE UNIT

BACKGROUND OF THE INVENTION

1. Field of the Invention

The present invention relates to a direct drive guide unit performing guidance of relative motion that is used in mechanisms that perform linear relative motion in, for example, machine tools and industrial robots.

2. Description of the Prior Art

An example of this type of direct drive guide unit of the prior art is indicated in FIG. 1.

As indicated in FIG. 1, said direct drive guide unit has steel track rail 1, in which tracks in the form of a pair of track grooves 1a are formed in both the right and left sides along the lengthwise direction, two rolling element circulating paths (to be later described in detail) corresponding to each of said track grooves 1a, and a slider in the form of sliding unit 2 able to move relative to said track rail 1. A plurality of rolling elements in the form of balls 3, that bear the load by circulating while rolling along the above-mentioned track groove 1a accompanying movement of sliding unit 2, are arranged and contained within said rolling element circulating paths.

Sliding unit 2 has casing 5, straddled across track rail 1, a pair of end caps 6 and 7 coupled to both ends of said casing 5, and two seals 8 and 9 mounted on the outside surface of each said end cap 6 and 7. Furthermore, casing 5 and end caps 6 and 7 are made of a metal such as steel. Each above-mentioned rolling element circulating path is composed of two sets of load bearing track groove 5a and return path 5b, each formed linear and mutually in parallel with both the left and right ends of casing 5, roughly semi-circular direction changing paths (not shown) that connect both ends of said load bearing track groove 5a and return path 5b, formed in both end caps 6 and 7. Furthermore, the above-mentioned loading bearing track groove 5a is in opposition to track groove 1a of track rail 1.

The above-mentioned direct drive guide unit of the prior art has the shortcomings described below.

(1) Formation of the above-mentioned rolling element circulating paths and assembly of the unit is not always easy, and there are a large number of parts.

(2) Since the members that perform relative operation are made of metal, together with the noise produced during operation being relatively large, providing of lubricating oil must be performed frequently.

(3) Rust forms easily and there is poor resistance to chemicals and so forth.

(4) Since the unit has a high degree of magnetic permeability, it is easily subjected to magnetism.

(5) Due to the large mass, the unit has large inertia and its response to applied driving force is not favorable.

SUMMARY OF THE INVENTION

The object of the present invention is to provide a direct drive guide unit that eliminates each of the above-mentioned shortcomings of the prior art.

The direct drive guide unit according to the present invention comprises: a track rail in which a track is formed along the lengthwise direction; a slider able to move relative to the above-mentioned track rail having a rolling element circulating path corresponding to said track; and, a plurality of rolling elements that bear the load by circulating while rolling over the above-mentioned track, and are arranged and contained with the above-mentioned rolling element circulating path; wherein, the above-mentioned slider is composed by coupling a plurality of divided pieces, each having a circulating path forming surface that forms the above-mentioned rolling element circulating path by being mutually joined together.

DESCRIPTION OF THE PREFERRED EMBODIMENTS

The following provides a description of the preferred embodiments of the present invention with reference to the drawings.

Figure 1:
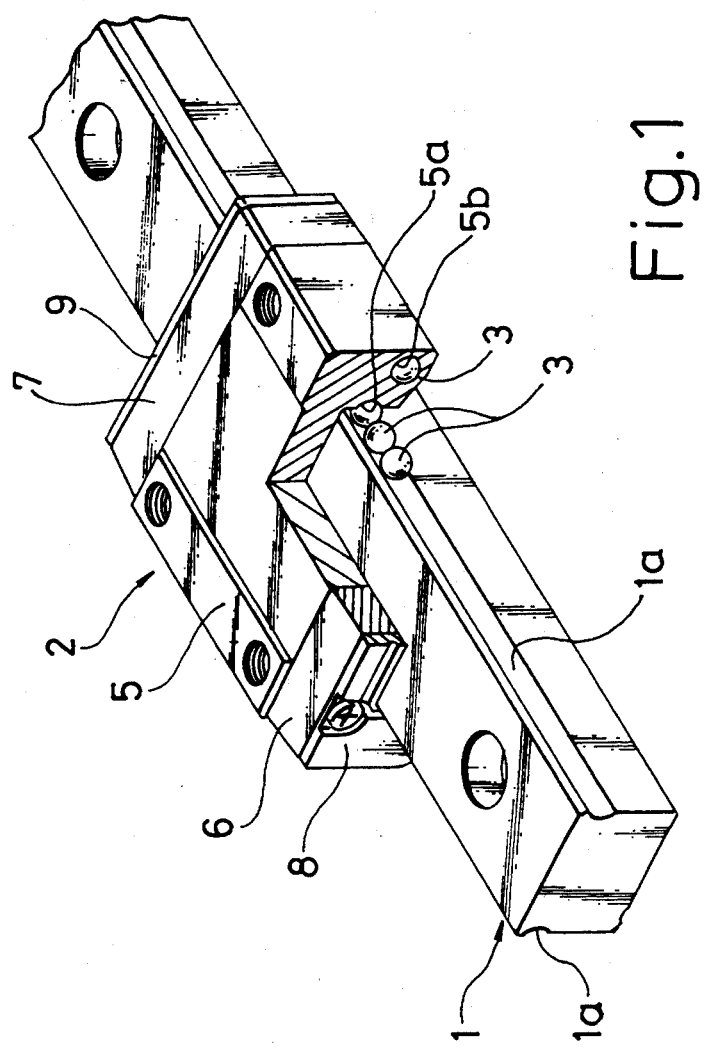
FIG. 1 is a perspective view, including a partial cross-section, of the essential components of a direct drive guide unit of the prior art.
Figure 2:
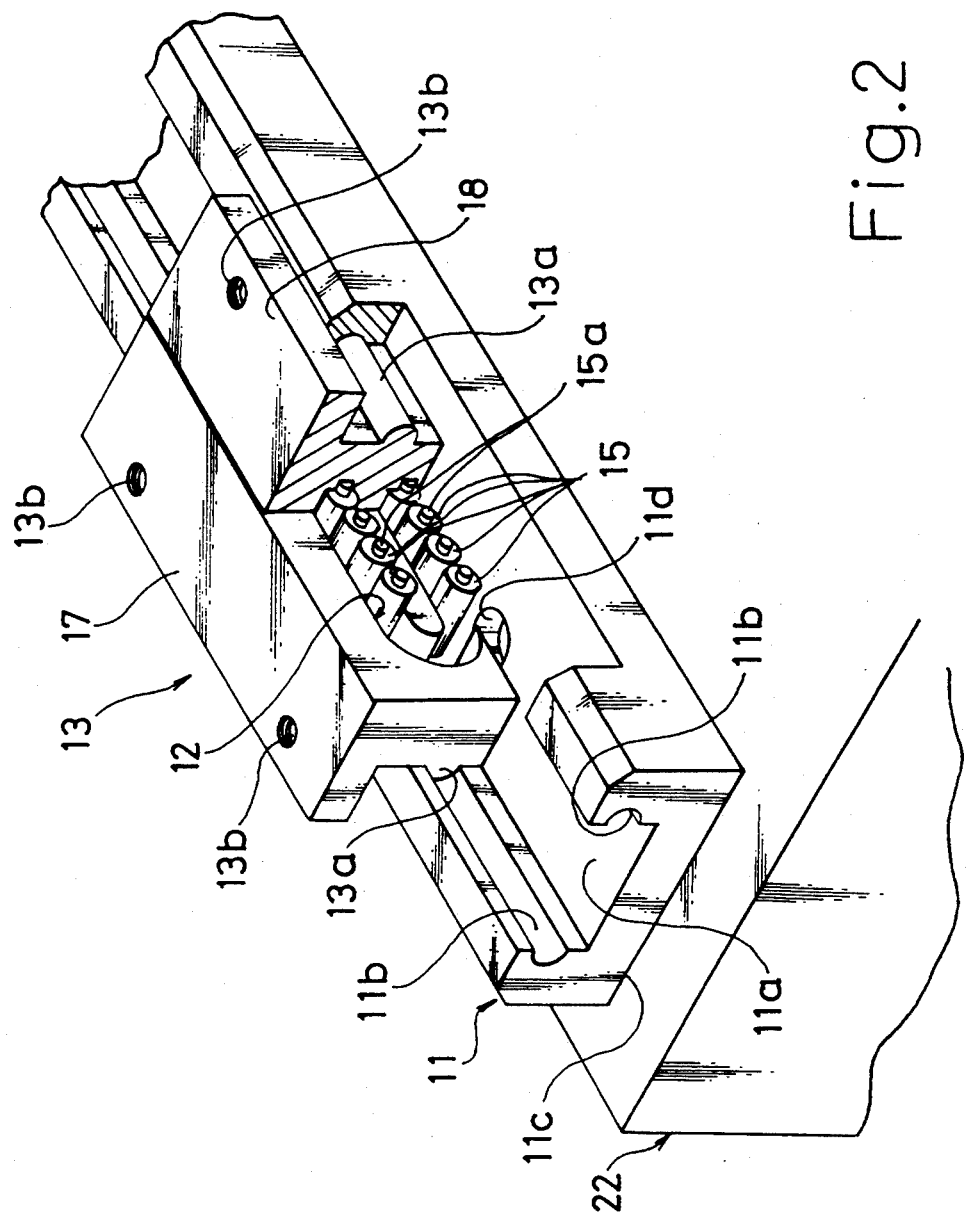
FIG. 2 is a perspective view, including a partial cross-section, indicating a direct drive guide unit in the form of a first embodiment of the present invention mounted on the bed of a machine tool.
Figure 3:
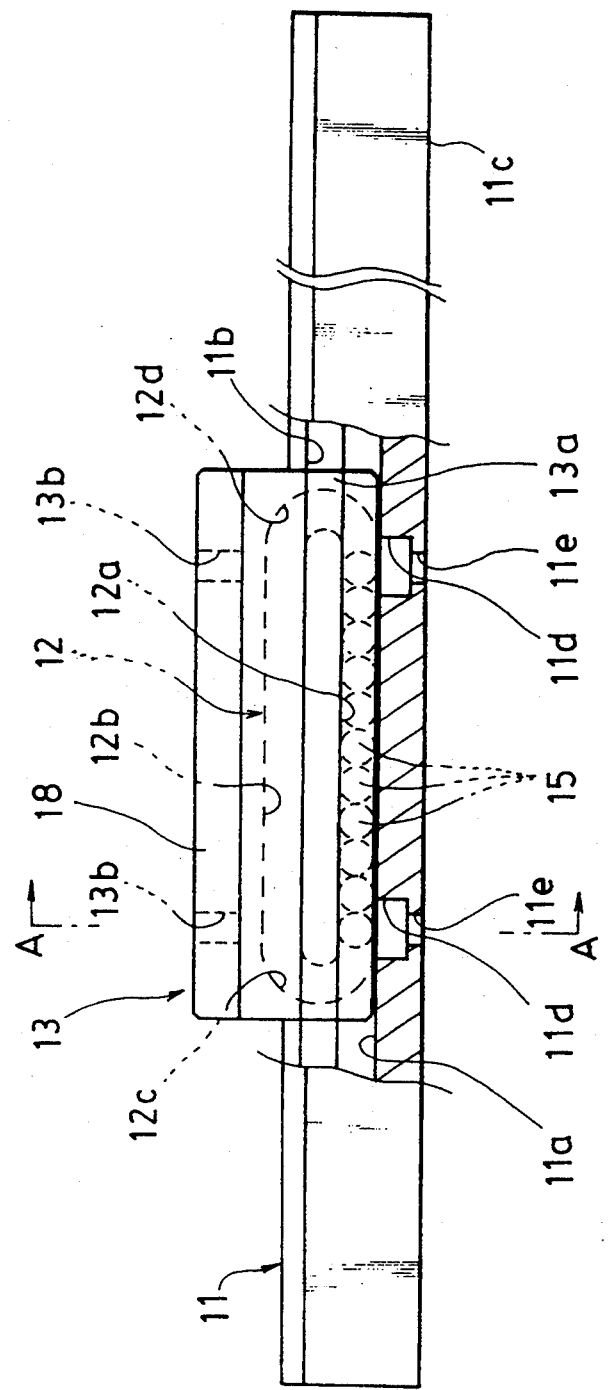
FIG. 3 is a front view, including a partial cross-section, of the direct drive guide unit indicated in FIG. 2.
Figure 4:
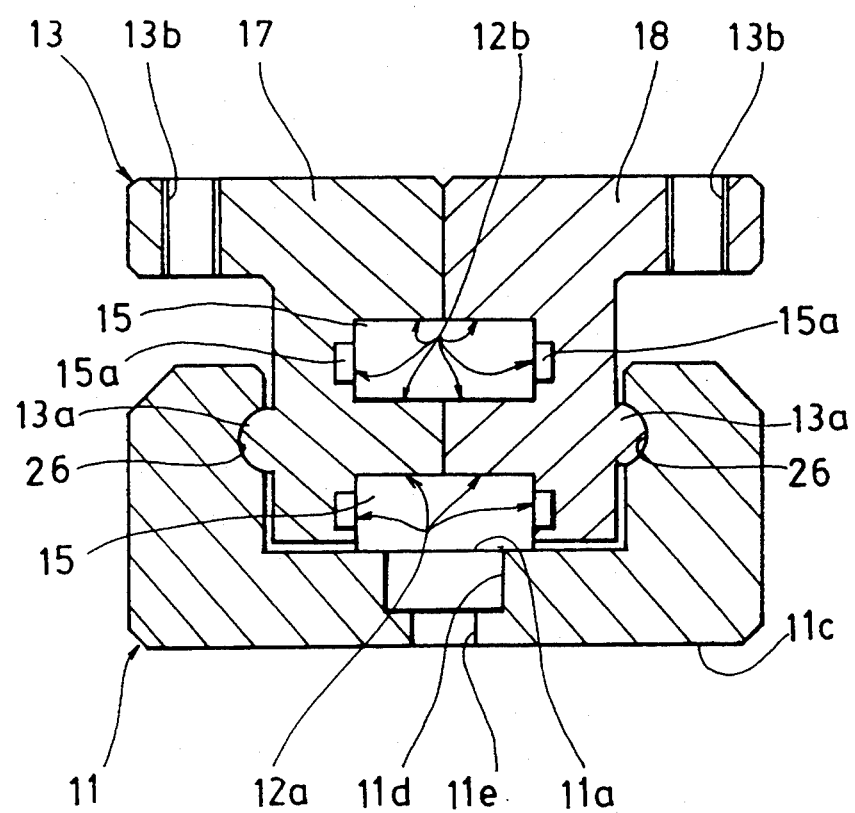
FIG. 4 is a cross-sectional view taken along A-A relating to FIG. 3.

FIGS. 2 through 4 indicate a direct drive guide unit in the form of a first embodiment of the present invention. As indicated in the drawings, said direct drive guide unit has track rail 11, formed so that the shape of its cross-section perpendicular to the lengthwise direction is that of roughly the letter "U" opened upwards, rolling element circulating path 12 (reference numerals shown in FIGS. 2 and 3, to be later described in detail), and slider 13 able to move relative to said track rail 11. The upper surface of the bottom portion of track rail 11 is formed flat over its entire length in the lengthwise direction of said track rail 11, and this serves as a track in the form of track surface 11a. The above-mentioned rolling element circulating path 12 corresponds to this track surface 11a. Furthermore, the form of said track is not limited to a flat surface as indicated above, but may also be in the form of a groove. This applies similarly to other embodiments to be described later. A plurality of rolling elements in the form of rollers 15, that bear the downward load between track rail 11 and slider 13 by circulating while rolling over this track surface 11a accompanying movement of said slider 13, are arranged and contained within the above-mentioned rolling element circulating path 12.

As indicated in FIGS. 3 and 4, the above-mentioned rolling element circulating path 12 is composed of load bearing track groove 12a and return path 12b, each formed linearly and mutually in parallel, and a pair of roughly semicircular direction changing paths 12c and 12d that said load bearing track groove 12a and return path 12b at both their ends. Furthermore, this load bearing track groove 12a is in opposition to track rail 11.

On the other hand, two track grooves 11b are formed along the lengthwise direction of track rail 11 on the right and left insides of said track rail 11. Two track projections 13a, that make sliding contact with these track grooves 11b, are protruding from both the right and left sides of slider 13. Furthermore, the shapes of the cross-sections of said track grooves 11b and track projections 13a are semicircular.

The above-mentioned track grooves 11b and track projections 13a, or in other words, the portions making sliding contact, bear the load in lateral direction perpendicular to the direction of the load borne by the above-mentioned rollers 15 (downward direction). In addition, these track grooves 11b and track projections 13a also act as detachment restraints that restrict the mutual detachment of track rail 11 and slider 13.

However, the above-mentioned track rail 11, slider 13 and rollers 15 are made of plastic. Track rail 11 is molded entirely as a single structure. In addition, as is clear from FIGS. 2 and 4, slider 13 is formed by coupling a left and right pair of divided pieces 17 and 18 made of plastic by fastening members such as small screws (not shown), adhesive or ultrasonic fusion. These divided pieces 17 and 18 each has a circulating path forming surface (reference numerals not shown) that forms the above-mentioned rolling element circulating path 12 as a result of joining together. Said circulating path forming surfaces are molded simultaneously at the time of molding each of said divided pieces 17 and 18 by a metal mold. Furthermore, as indicated in FIGS. 2 and 4, rollers 15 have projections 15a on both of their ends for being supported by slider 13, and groove portions corresponding to these projections 15a are formed in the above-mentioned circulating path forming surfaces.

As is clear from FIGS. 2 and 4, slider 13 is divided into two pieces along the lengthwise direction of rolling element circulating path 12, and these pieces are the above-mentioned divided pieces 17 and 18. Both divided pieces 17 and 18 are shaped symmetrically with respect to the plane of division. As a result of having this constitution, both divided pieces 17 and 18 are able to be molded using the same metal mold.

Furthermore, slider 13 is not limited to being divided into two divided pieces, but may naturally also be formed by coupling 3 or more divided pieces. However, the use of only two divided pieces as indicated above requires a smaller number of molding machines containing the metal mold. In addition, in the above-mentioned constitution, the work of installing rollers 15 during coupling of both divided pieces 17 and 18 to assemble slider 13 is easy. In addition, besides using plastic for the material of the above-mentioned track rail 11, a metal such as steel may also be used, while a metal, such as steel, or ceramics may be used for the material of rollers 15.

The direct drive guide unit having the above-mentioned constitution is, for example, arranged on a frame in the form of flat bed 22 equipped on a machine tool as indicated in FIG. 2 (not shown entirely). Track rail 11 is fastened to said bed 22 by a plurality of fastening members in the form of bolts (with hexagon sockets: not shown). For this purpose, track rail 11 has a flat mounting surface 11c on its bottom for mounting said track rail 11 to bed 22. Furthermore, as indicated in FIGS. 2 through 4, countersunk portions 11d, having a diameter larger than the heads of said bolts, and holes 11e, having a diameter slightly larger than the threaded portions of said bolts arranged concentrically and in a row in the lengthwise direction of said track rail 11. Said bolts are inserted and screwed into bed 22 so as to be completely embedded in countersunk portions 11d and holes 11e. In addition, as indicated in the drawings, a plurality of threaded holes 13b are formed in the upper surface of slider 13. A table that holds a workpiece and so forth (not shown) is fastened to said slider 13 by bolts (with hexagon sockets: not shown) that are screwed into these holes 13b.

FIGS. 5 through 8 indicate a direct drive guide unit in the form of a second embodiment of the present invention.

As indicated in the drawings, the direct drive guide unit of the second embodiment has track rail 31, in which flat track surface 31a, or in other words, a track, is formed on its apex over its entire length, slider 33 able to move relative to said track rail 31, having rolling element circulating path 32 (reference numeral indicated in FIG. 7, to be later described in detail) corresponding to said track surface 31a, and being straddled across said track rail 31, and a plurality of rolling elements in the form of roller 35 arranged and contained within said rolling element circulating path 32, that bear the downward load between track rail 31 and slider 33 by circulating while rolling over the above-mentioned track surface 31a accompanying movement of slider 33.

Figure 6:
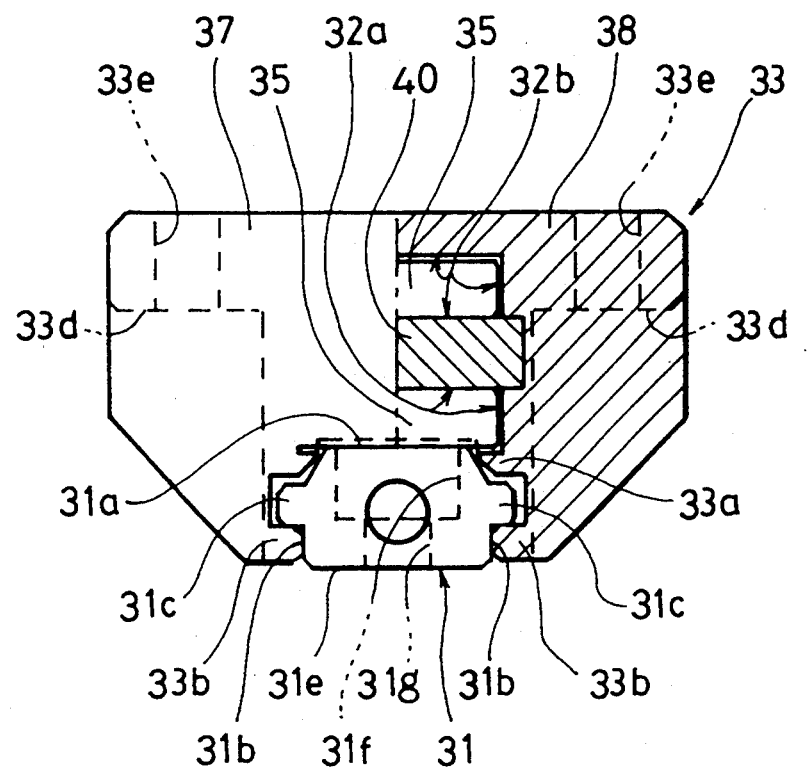
FIG. 6 is a side view, including a partial cross-section, of the direct drive guide unit indicated in FIG. 5.
Figure 7:
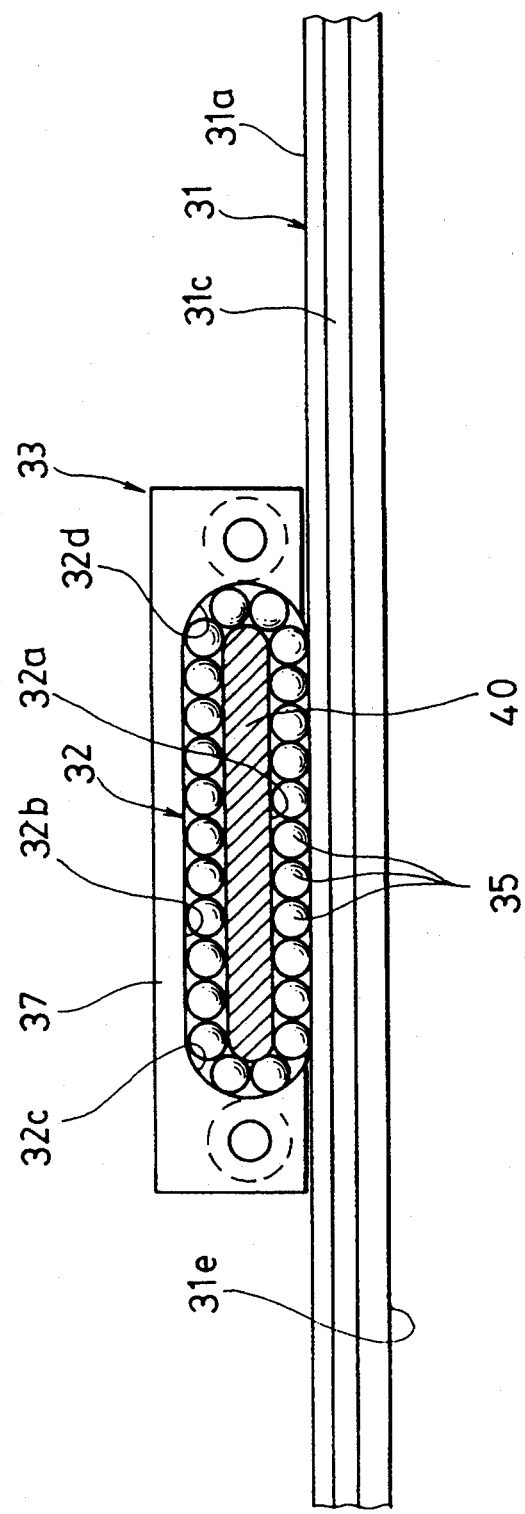
FIG. 7 is a front view, including a partial cross-section, of the direct drive guide unit indicated in FIGS. 5 and 6.
Figure 8:
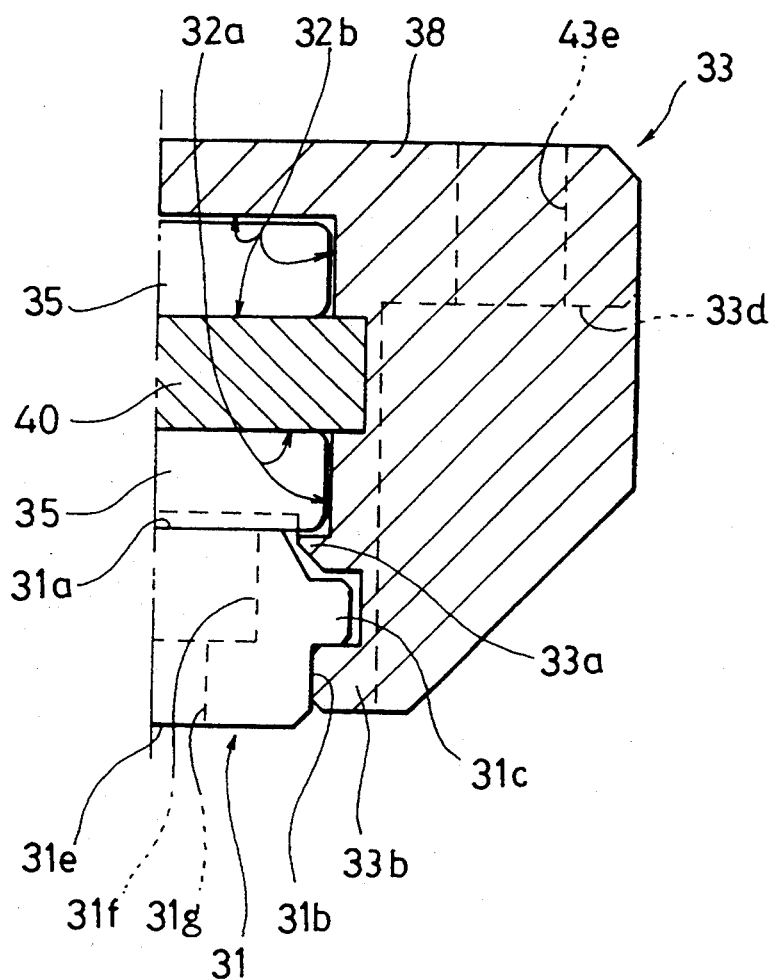
FIG. 8 is an enlarged view of the essential components of the direct drive guide unit indicated in FIGS. 5 through 7.

As indicated in FIG. 7, the above-mentioned rolling element circulating path 32 is composed of load bearing track groove 32a and return path 32b (reference numerals indicated in FIGS. 6 and 8), each formed linearly and parallel to each other, and a pair of semicircular direction changing paths 32c and 32d that connect said load bearing track groove 32a and return path 32b at both their ends. Furthermore, this load bearing track groove 32a is in opposition to track surface 31a of said track rail 31. Furthermore, as indicated in FIGS. 6 and 8, projections 33a are formed in slider 33 to prevent rollers 35 from coming out of said loading bearing track groove 32a.

On the other hand, two projections 33b are formed on the insides of both the left and right sides of slider 33 along the direction in which said slider 33 is to move. Each of the tips of these projections 33b makes sliding contact with both sides 31b of the lower portion of track rail 31.

Each of the above-mentioned projections 33b and both sides 31b, or in other words, the portions making sliding contact, bears the load in the lateral direction perpendicular to the direction of the load borne by the above-mentioned rollers 35 (downward direction).

In addition, two projections 31c protrude along the lengthwise direction of track rail 31 on both the left and right sides of said track rail 31, and each of the above-mentioned projections 33b possessed by slider 33 make sliding contact with the lower surface of these projections 31c with their respective upper surfaces. These projections 31c and 33b act as detachment restraints that restrict the mutual detachment of track rail 31 and slider 33.

The above-mentioned track rail 31, slider 33 and rollers 35 are made of plastic.

Track rail 31 is molded entirely as a single structure.

Figure 5:
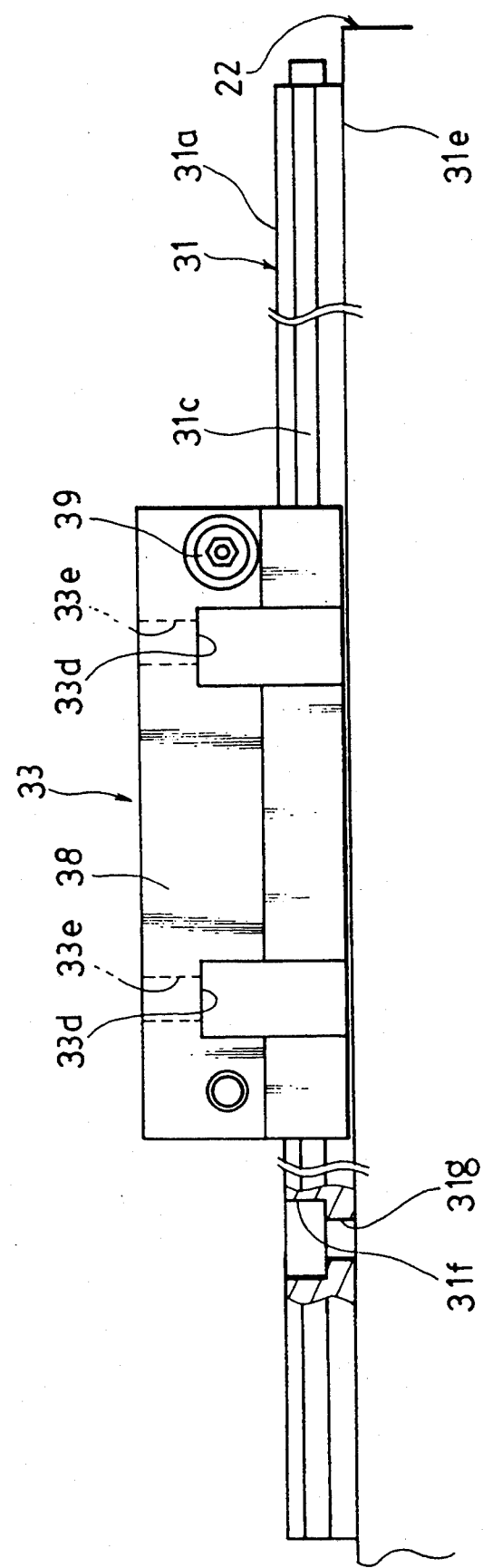
FIG. 5 is a front view, including a partial cross-section, indicating a direct drive guide unit in the form of a second embodiment of the present invention mounted on the bed of a machine tool.

On the other hand, as is clear from FIG. 6, slider 33 is formed by coupling a left and right pair of divided pieces 37 and 38 made of plastic by a suitable coupling device such as bolt 39 (with hexagon socket) as indicated in FIG. 5 (indicated in the explanation of the above-mentioned first embodiment). However, as is clear from FIGS. 7 and 8, in said direct drive guide unit, track plate 40 is juxtapositioned between the above-mentioned right and left divided pieces 37 and 38. This track plate 40 is made of a metal such as steel, plastic or ceramics, and acts as a reinforcing member that mutually couples both said divided pieces 37 and 38 by securing each divided piece 37 and 38 on both of their sides. Furthermore, as previously described, since each divided piece 37 and 38 is itself also mutually coupled by adhesive and so forth, by providing a reinforcing member in the form of track plate 40, the coupled state of both divided pieces 37 and 38 is extremely rigid. This effect is especially remarkable if track plate 40 is made of metal.

As is clear from FIG. 6, slider 33 is divided into two pieces along the lengthwise direction of rolling element circulating path 32, and those two pieces are the above-mentioned divided pieces 37 and 38. In addition, both divided pieces 37 and 38 have symmetrical shapes with respect to the plane of division. Each of these divided pieces 37 and 38 have a circulating path forming surface (reference numerals not shown) that forms the above-mentioned rolling element circulating path 32 as a result of joining together. Furthermore, as is clear from FIGS. 6 through 8, the above-mentioned track plate 40 makes sliding contact with each of the rollers 35 by forming a portion of the above-mentioned rolling element circulating path 32 with these circulating path forming surfaces.

Mounting surface 31e is formed on the bottom of track rail 31 for mounting said track Fall 31 on a bed 22 (shown in FIG. 5). In addition, countersunk portions 31e and holes 31f are arranged in parallel in track rail 31 for insertion of bolts (with hexagon heads: not shown) for fastening said track rail 31 to said bed 22. In addition, a plurality of countersunk portions 33d and holes 33e are formed in slider 33. A table that holds a workpiece and so forth (not shown) is fastened to said slider 33 by bolts (with hexagon sockets: not shown) that are inserted into these countersunk portions 33d and holes 33e.

The direct drive guide unit in the form of the above-mentioned second embodiment demonstrates similar effects as the direct drive guide unit as the above-mentioned first embodiment. Furthermore, besides using plastic for the material of the above-mentioned track rail 31, a metal such as steel may also be used, while a metal, such as steel, or ceramics may be used for the material of rollers 35.

Figure 9:
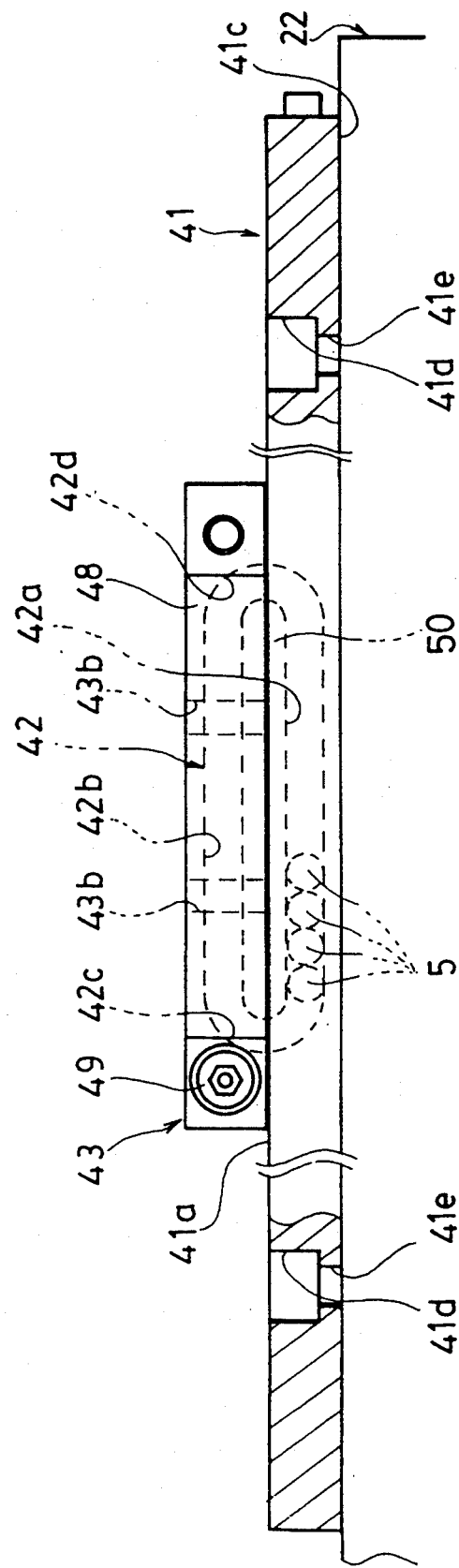
FIG. 9 is a front view, including a partial cross-section, indicating a direct drive guide unit in the form of a third embodiment of the present invention mounted on the bed of a machine tool.
Figure 10:
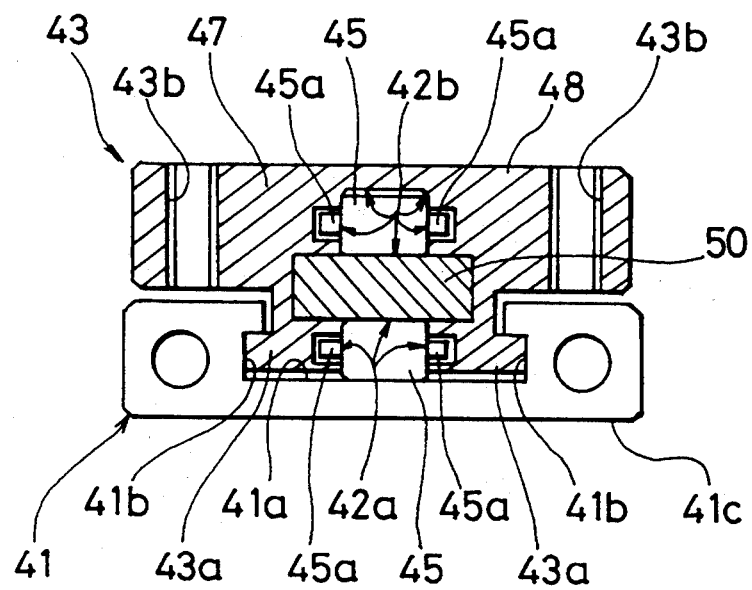
FIG. 10 is a side view, containing a partial cross-section, of the direct drive guide unit indicated in FIG. 9.
Figure 11:
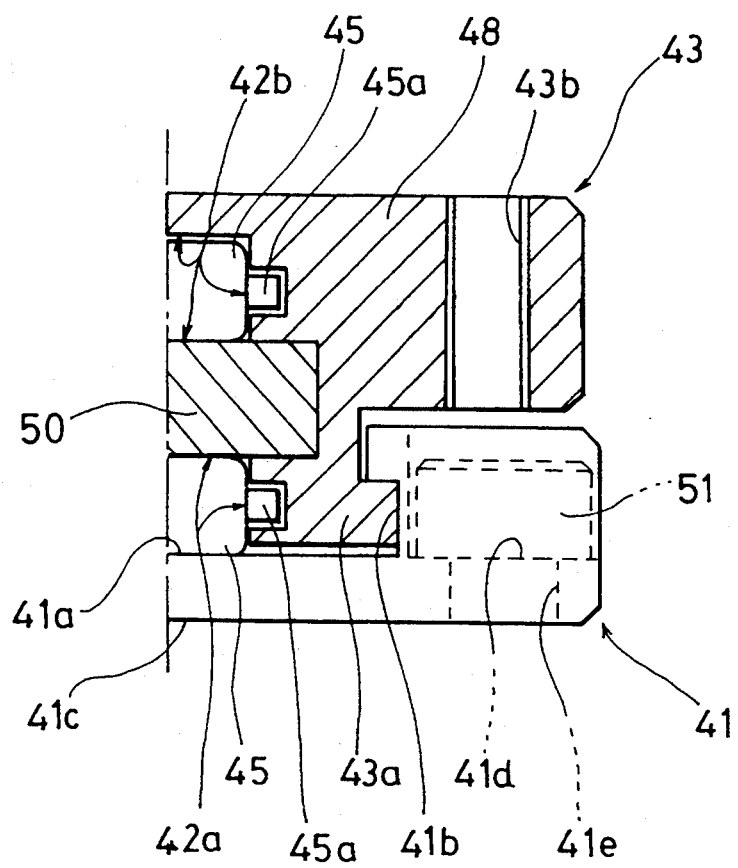
FIG. 11 is an enlarged view of the essential components of the direct drive guide unit indicated in FIGS. 9 and 10.

FIGS. 9 through 11 indicate a direct drive guide unit in the form of a third embodiment of the present invention. As shown in the drawings, said direct drive guide unit has track rail 41, in which the shape of its cross-section perpendicular to its lengthwise direction is roughly that of the letter "U" opened upward, and slider 43 able to move relative to said track rail 41 and having rolling element circulating path 42 (reference numeral indicated in FIG. 9: to be later described in detail). The upper surface of the bottom portion of track rail 41 is formed flat over the entire length in the lengthwise direction of said track rail 41, and serves as a track in the form of track surface 41a. The above-mentioned rolling element circulating path 42 corresponds to this track surface 41a.

A plurality of rolling elements in the form of rollers 45, that bear the downward load between track rail 41 and slider 43 by circulating while rolling over this track surface 41a accompanying movement of said slider 43, are arranged and contained within the above-mentioned rolling element circulating path 42.

As indicated in FIG. 9, the above-mentioned rolling element circulating path 42 is composed of load bearing track groove 42a and return path 42b, each formed linearly and parallel to each other, and a pair of semicircular direction changing paths 42c and 42d that connect said load bearing track groove 42a and return path 42b. Furthermore, this load bearing track groove 42a is in opposition to track surface 41a of track rail 41.

On the other hand, two track grooves 41b are formed along the lengthwise direction of track rail 41 on the insides of the right and left sides of said track rail 41. Two track projections 43a, that make sliding contact with these track grooves 41b, are protruding from both the left and right sides of slider 43. Furthermore, the cross-sections of said track grooves 41b and track projections 43a are roughly rectangular.

The above-mentioned track grooves 41b and track projections 43a, or in other words, the portions making sliding contact, bear the load in the lateral direction perpendicular to the direction of the load borne by the above-mentioned rollers 45 (downward direction). In addition, these track grooves 41b and track projections 43a act as detachment restraints that restrict the mutual detachment of track rail 41 and slider 43.

The above-mentioned track rail 41, slider 43 and rollers 45 are made of plastic. Track rail 41 is molded entirely as a single structure. In addition, as is clear from FIGS. 10 and 11, slider 43 is formed by coupling a left and right pair of divided pieces 47 and 48 made of plastic by a suitable coupling device such as bolt 49 (with hexagon socket) as shown in the drawings (indicated in the explanations of the above-mentioned first and second embodiments). However, in said direct drive guide unit, a plate-shaped track plate 50 is juxtapositioned between the above-mentioned right and left divided pieces 47 and 48. This track plate 50 is made of a metal, such as steel, plastic or ceramics, and acts as a reinforcing member that mutually couples both said divided pieces 47 and 48 by securing each divided piece 47 and 48 on both of their sides.

As is clear from FIGS. 9 and 11, slider 43 is divided into two pieces along the lengthwise direction of rolling element circulating path 42, and those two pieces are the above-mentioned divided pieces 47 and 48. In addition, both divided pieces 47 and 48 have symmetrical shapes with respect to the plane of division. Each of these divided pieces 47 and 48 have a circulating path forming surface (reference numerals not shown) that forms the above-mentioned rolling element circulating path 42 as a result of joining together. Furthermore, as is clear from FIGS. 10 and 11, the above-mentioned track plate 50 makes sliding contact with each of the rollers 45 by forming a portion of the above-mentioned rolling element circulating path 42 with these circulating path forming surfaces. In addition, as indicated in FIGS. 10 and 11, rollers 45 have projections 45a on both of their ends to be supported by slider 43, and grooves corresponding to these projections 45a are formed in the above-mentioned circulating path forming surfaces.

Mounting surface 41c is formed on the bottom of track rail 41 for mounting said track rail 41 on a bed 22 (shown in FIG. 9). In addition, countersunk portions 41d and holes 41e are arranged in parallel in track rail 41 for insertion of bolts 51 (with hexagon heads: shown in FIG. 11) for fastening said track rail 41 to said bed 22.

In addition, a plurality of threaded holes 43b are formed in slider 43. A table that holds a workpiece and so forth (not shown) is fastened to said slider 43 by bolts (with hexagon sockets: not shown)that are screwed into these threaded holes 43b.

The direct drive guide unit in the form of the above-mentioned third embodiment demonstrates similar effects as the direct drive guide units in the form of the above-mentioned first and second embodiments. Furthermore, besides using plastic for the material of the above-mentioned track rail 41, a metal such as steel may also be used, while a metal, such as steel, or ceramics may be used for the material of rollers 45.

According to the present invention as explained above, a constitution is provided wherein a slider is formed by coupling a plurality of divided pieces each having a circulating path forming surface able to form a rolling element circulating path by joining together. Accordingly, in said constitution, since the work of installing the rolling elements during mutual coupling of these divided pieces is easy, thus offering a first advantage of assembly of the unit being simple.

Moreover, in the direct drive guide unit according to the present invention, since the members that comprise said guide unit are essentially only a track rail, slider and rolling elements, the number of parts can be held to a small amount, thus offering a second advantage of the present invention.

In addition, in the present invention, in addition to a low level of noise and operation not requiring lubrication being able to be achieved by using a slider and so forth made of plastic, the invention is resistant to both rust and chemicals while also not being susceptible to magnetism. Moreover, since the amount of inertia during operation is low, a unit can be obtained having favorable response characteristics.

What is claimed is:

1. A direct drive guide unit comprising: a track rail in which a track is formed along the lengthwise direction; a slider able to move relative to the above-mentioned track rail having a rolling element circulating path corresponding to said track; and a plurality of rolling elements that bear the load by circulating while rolling over the above-mentioned track, and are arranged and contained with the above-mentioned rolling element circulating path; wherein the above-mentioned slider is composed by coupling a plurality of divided pieces, said divided pieces being divided along the lengthwise direction of the above-mentioned rolling element. Circulating path, and each of said divided pieces having a circulating path forming surface that forms the above-mentioned rolling element circulating path by being mutually joined together.

2. The direct drive guide unit described in claim 1 wherein the above-mentioned slider is made of plastic.

3. The direct drive guide unit described in claim 1 wherein each of the above-mentioned divided pieces has a symmetrical shape with respect to their plane of division.

4. A direct drive guide unit comprising: a track rail in which e track is formed along the lengthwise direction; a slider able to move relative to the above-mentioned track rail having a rolling element circulating path corresponding to said track; a plurality of rolling elements that bear the load by circulating while rolling over the above-mentioned track, and are arranged and contained with the above-mentioned rolling element circulating oath; and sliding contact portions formed in the above-mentioned track rail and slider that bear the load in the direction roughly perpendicular to the direction of the load borne by the above-mentioned rolling elements by mutually making sliding contact; wherein the above-mentioned slider is composed by coupling a plurality of divided pieces, each having a circulating path forming surface that forms the above-mentioned rolling element circulating path by being mutually joined together.

5. A direct drive guide unit comprising: a track rail in which a track is formed along the lengthwise direction; a slider able to move relative to the above-mentioned track rail having a rolling element circulating path corresponding to said track; a plurality of rolling elements that bear the load by circulating while rolling over the above-mentioned track, and are arranged and contained with the above-mentioned rolling element circulating path; and detachment restraints formed in the above-mentioned track rail and slider that restrict the mutual detachment of the above-mentioned track rail and slider as a result of making sliding contact; wherein the above-mentioned slider is composed by coupling a plurality of divided pieces, each having a circulating path forming surface that forms the above-mentioned rolling element circulating path by being mutually joined together.

6. A direct drive guide unit comprising: a track rail in which a track is formed along the lengthwise direction; a slider able to move relative to the above-mentioned track rail having a rolling element circulating path corresponding to said track; and a plurality of rolling elements that bear the load by circulating while rolling over the above-mentioned track, and are arranged and contained with the above-mentioned rolling element circulating path; wherein the above-mentioned slider is composed by coupling a plurality of divided pieces, each having a circulating path forming surface that forms the above-mentioned rolling element circulating path by being mutually joined together, and a reinforcing member that mutually couples each of the above-mentioned divided pieces by being secured to each of the above-mentioned divided pieces.

7. The direct drive guide unit described in claim 6 wherein the above-mentioned reinforcing member is a track plate that makes sliding contact the above-mentioned rolling elements by forming a portion of the above-mentioned rolling element circulating path.

8. The direct drive guide unit described in claim 7 wherein the above-mentioned reinforcing member is made of metal.

* * * * *